(12) United States Patent
Dyal

(10) Patent No.: US 8,112,978 B1
(45) Date of Patent: Feb. 14, 2012

(54) MOBILE HEDGING MACHINE

(76) Inventor: Mitchell C. Dyal, Baxley, GA (US)

( * ) Notice: Subject to any disclaimer, the term of this patent is extended or adjusted under 35 U.S.C. 154(b) by 0 days.

(21) Appl. No.: 12/854,961

(22) Filed: Aug. 12, 2010

(51) Int. Cl.
*A01G 3/04* (2006.01)
(52) U.S. Cl. ........................................................ 56/233
(58) Field of Classification Search .................... 56/234, 56/233, 237, 236, 235, 238, 245; 144/34.1, 144/34.5, 208.3, 208.8
See application file for complete search history.

(56) References Cited

U.S. PATENT DOCUMENTS

| | | | |
|---|---|---|---|
| 3,396,521 A | 8/1968 | McKibben et al. | |
| 3,496,709 A * | 2/1970 | Egbert et al. | 56/237 |
| 3,827,222 A | 8/1974 | Toti | |
| 3,888,071 A * | 6/1975 | Wallace | 56/237 |
| 3,952,485 A * | 4/1976 | McRobert | 56/235 |
| 4,067,178 A * | 1/1978 | Miller | 56/235 |
| 4,212,148 A | 7/1980 | Brownlee | |
| 4,255,922 A * | 3/1981 | Hiyama et al. | 56/330 |
| 4,291,526 A * | 9/1981 | Hiyama et al. | 56/330 |
| 4,383,401 A * | 5/1983 | Lessard et al. | 56/236 |
| 4,543,775 A * | 10/1985 | Horn et al. | 56/235 |
| 4,683,969 A | 8/1987 | Littau | |
| 4,777,787 A * | 10/1988 | Warren | 56/235 |
| 4,989,365 A * | 2/1991 | Roger | 47/1.01 R |
| 5,074,107 A | 12/1991 | Windemuller | |
| 5,107,592 A * | 4/1992 | Downey et al. | 30/379.5 |
| 5,259,177 A | 11/1993 | Windemuller et al. | |
| 5,544,444 A * | 8/1996 | Oldridge | 47/4 |
| 5,718,106 A | 2/1998 | Waldron | |
| 6,085,505 A * | 7/2000 | Edwards | 56/15.2 |
| 6,158,203 A | 12/2000 | Scott | |
| 6,523,337 B2 * | 2/2003 | Spagnolo | 56/234 |
| 6,634,162 B1 * | 10/2003 | Andros | 56/328.1 |
| 6,860,093 B2 * | 3/2005 | Scordilis | 56/15.2 |
| 6,959,528 B1 * | 11/2005 | Scordilis | 56/15.8 |
| 6,964,151 B2 | 11/2005 | Ezendam et al. | |
| 7,204,072 B2 * | 4/2007 | Joy et al. | 56/233 |
| 7,640,091 B2 * | 12/2009 | Berg et al. | 701/50 |
| 7,652,766 B2 * | 1/2010 | Pellenc | 356/432 |
| 2004/0103631 A1 * | 6/2004 | Ezendam et al. | 56/233 |
| 2006/0162309 A1 * | 7/2006 | Schloesser | 56/255 |
| 2009/0090093 A1 * | 4/2009 | Pellenc | 56/10.2 E |

FOREIGN PATENT DOCUMENTS

GB 2149635 A * 6/1985

* cited by examiner

*Primary Examiner* — Arpad Fabian-Kovacs

(57) ABSTRACT

A mobile hedging machine includes a hedger frame having an elevated platform supported by a plurality of spaced apart legs to form a passage under which hedges are traversable in a travel direction. A plurality of motor-driven wheels are mounted to lower ends of the legs allowing the machine to be driven and steered. First and second cutter arms extend from generally opposite sides of the elevated platform generally perpendicular to the travel direction. Each cutter arm includes an upper arm positionable generally perpendicular to the travel direction, a lower arm pivotable about an axis generally parallel to the travel direction, and a cutter head attached to a lower end of the lower arm. The cutter arms are preferably offset in the travel direction. A topper assembly is secured to a forward edge of the platform and vertically positionable relative thereto.

20 Claims, 4 Drawing Sheets

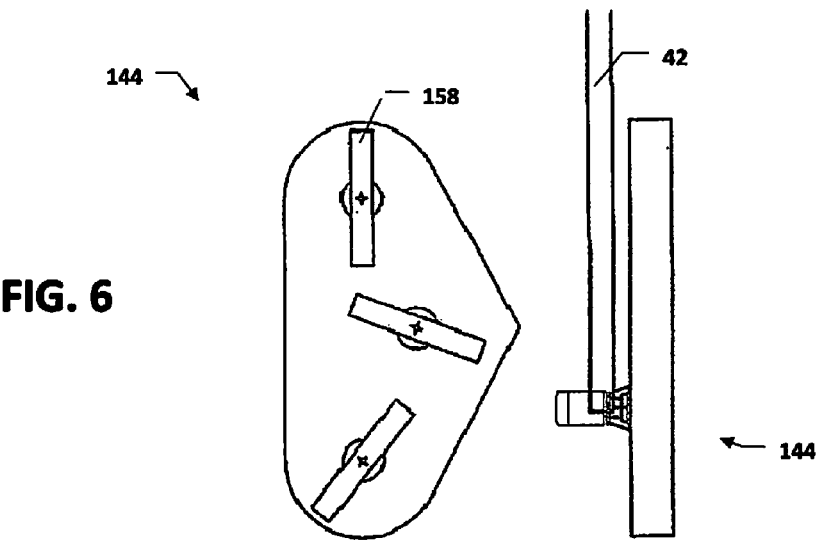
FIG. 6
FIG. 7
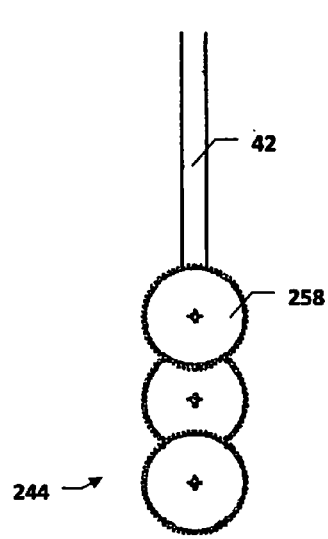
FIG. 8
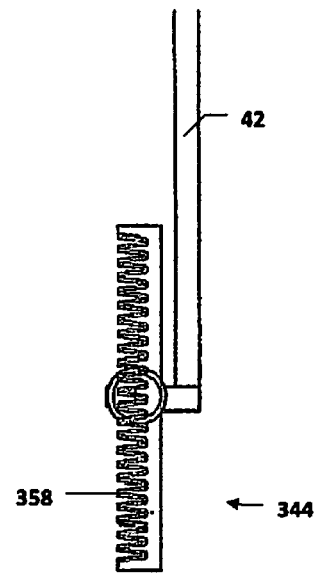
FIG. 9

MOBILE HEDGING MACHINE

FIELD OF THE INVENTION

The present invention relates vehicle-mounted hedging machines, and more particularly, to mobile hedging machines used in connection with blueberry and other berry crops.

BACKGROUND OF THE INVENTION

Many types of plant growth require periodic hedging for optimal growth and/or crop yield. As used herein, "plant growth" refers generically to any live vegetation, and is not necessarily restricted to agricultural crops, and "hedging" refers generically to the trimming of such plant growth. Blueberry bushes are one example of plant growth that it is necessary to hedge periodically, both to maximize blueberry production and to facilitate subsequent harvesting of blueberries Manual hedging is extremely time- and labor-intensive. Available hedging machines suffer from various drawbacks. For example, many machines hedge only one side of a plant, requiring multiple passes for complete hedging. U.S. Pat. No. 6,964,151 shows an example of a cutting device and vehicle that can shape multiple sides of a bush simultaneously, but is poorly suited for complete hedging of plant growth during continuous motion of the vehicle.

SUMMARY OF THE INVENTION

In view of the foregoing, it is an object of the present invention to provide an improved mobile hedging machine. According to an embodiment of the present invention, a mobile hedging machine includes a hedger frame having an elevated platform supported by a plurality of spaced apart legs to form a passage under which hedges are traversable in a travel direction. A plurality of motor-driven wheels are mounted to lower ends of the legs allowing the machine to be driven and steered. First and second cutter arms extend from generally opposite sides of the elevated platform generally perpendicular to the travel direction. Each cutter arm includes an upper arm positionable generally perpendicular to the travel direction, a lower arm pivotable about an axis generally parallel to the travel direction, and a cutter head attached to a lower end of the lower arm. The cutter arms are preferably offset in the travel direction.

According to an aspect of the present invention, an operator station is located on the platform having controls to drive and steer the machine. According to a further aspect of the present invention, driving and steering of the machine and the operation of the first and second cutter arms are hydraulically-powered. According to an additional aspect of the present invention, a topper assembly can be connected to a forward end of the platform, the topper assembly including a vertically positionable topper cutter head.

The mobile hedging machine can also include an agricultural spray tank, at least one spray nozzle arranged under the platform to dispense an agricultural spray from the agricultural spray tank, and a spray pressure source to impel the agricultural spray from the spray tank out the at least one spray nozzle. Multiple spray nozzles can be located along generally U-shaped spray piping extending under the platform and down opposing legs.

These and other objects, aspects and advantages of the present invention will be better appreciated in view of the drawings and following detailed description of preferred embodiments.

BRIEF DESCRIPTION OF THE DRAWINGS

FIGS. 6-9 are views of alternate embodiments of cutter heads usable in connection with the cutter arms of FIG. 1.

DETAILED DESCRIPTION OF PREFERRED EMBODIMENTS

Figure 1:
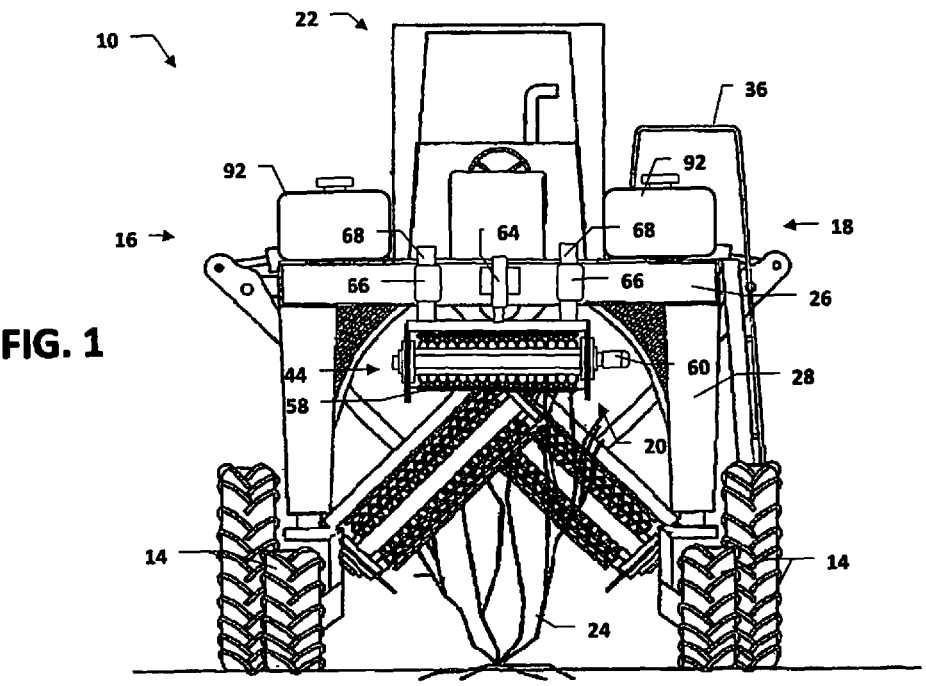
FIG. 1 is a front view of a mobile hedging machine including a hedger frame and cutter arms, according to an embodiment of the present invention.
Figure 2:
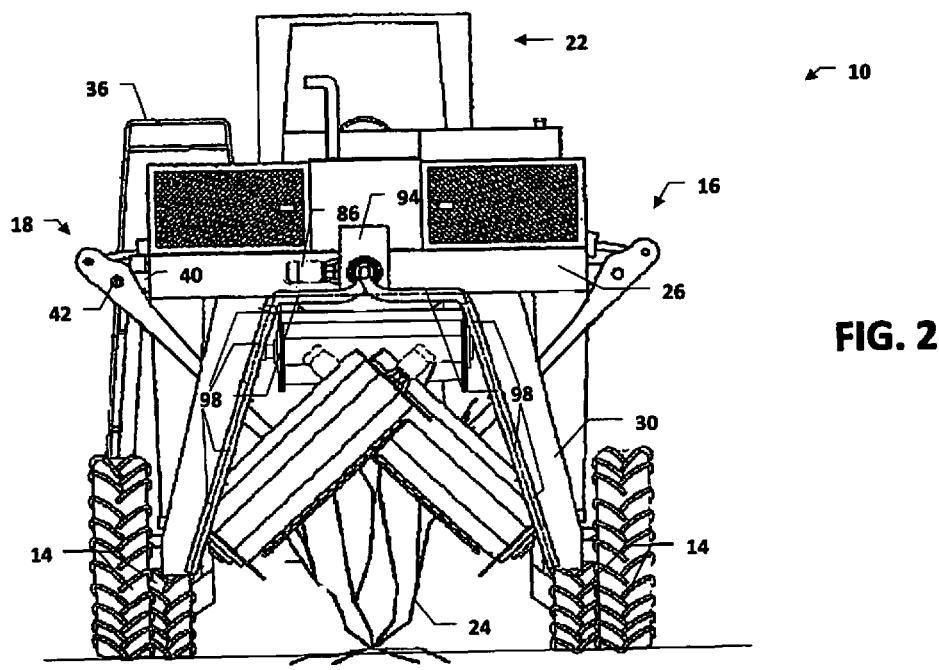
FIG. 2 is a rear view of the machine of FIG. 1.

According to an embodiment of the present invention, referring to FIGS. 1 and 2, a mobile hedging machine 10 includes a hedger frame 12, a plurality of wheels 14 secured to lower portions thereof, first and second cutter arms 16, 18 secured to sides thereof, and a topper assembly 20 secured to a forward end thereof. An operator station 22 is located on top of the hedger frame 12. As will be explained in greater detail below, the mobile hedging machine 10 is operable to traverse plant growth 24 under the frame 12 and selectively engage the same with the first and second cutter arms 16, 18.

The hedger frame 12 includes an elevated platform 26 from which forward and rearward pairs of legs 28, 30 downwardly depend. A corresponding one of the wheels 14 is rotatably connected to a lower end of each leg 28, 30. The wheels 14 connected to the lower ends of the forward pair of legs 28 are also pivotably mounted to permit steering.

Figure 3:
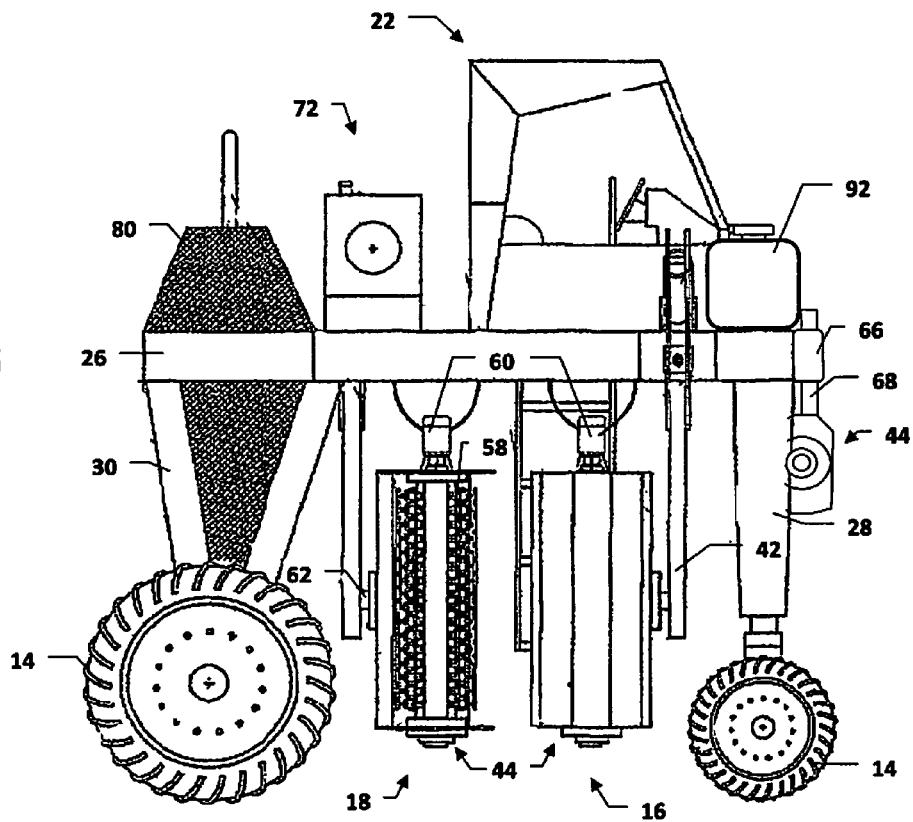
FIG. 3 is a side view of the machine of FIG. 1.
Figure 4:
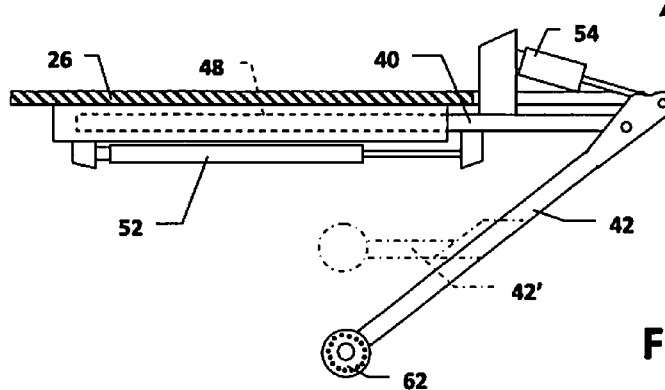
FIG. 4 is a front view of an exemplary one of the cutter arms of FIG. 1.

The pairs of legs 28, 30 both cooperate with the platform 26 to form a generally U-shaped passage under which the plant growth 24 can be accommodated when moving in a travel direction (into and out of the page, with reference to FIGS. 1, 2 and 4; left and right with reference to FIG. 3). To assist an operator in ascending to the control station 22, the hedger frame also includes a ladder 36.

Referring to FIGS. 3 and 4, the first and second cutter arms 16, 18 (for expediency, only one cutter arm is shown in FIG. 4; however the cutter arms are substantially identical, but reversed) extend from first and second sides of the platform 26. Each cutter arm 16, 18 includes an upper arm 40, a lower arm 42 and a cutter head 44. The second cutter arm 18 is offset rearwardly from the first cutter arm 16 in the travel direction to more efficiently utilize the space under the platform 26 and enhance cutting options.

The upper arm 40 is slidably mounted to the platform 26, for instance in a passage 48, allowing extension and retraction generally perpendicular to the travel direction. The lower arm 42 is pivotably mounted to the upper arm, allowing pivotal motion about an axis generally parallel to the travel direction. Other lower arm geometries could alternately be employed; for instance, a lower arm 42' (shown in broken lines) incorporating a fixed elbow could be used.

An upper actuator 52, mounted to the platform 26 and the upper arm 40, imparts the side-to-side motion to the upper arm 40. A lower actuator 54, mounted to the upper arm 40 and the lower arm 42 imparts the pivotal motion to the lower arm 42. Each actuator 52, 54 is preferably a linear hydraulic actuator.

The cutter heads 44 each include cutting elements 58 and a cutter head drive motor 60. The cutter heads 44 are preferably manually rotatable relative to the lower arms 42 by means of pivoting plates 62. Alternately the cutter heads 44 could be attached in a fixed relationship with the lower arms 42, or adapted for powered rotation. Preferably, the cutter head drive motors 60 are rotary hydraulic motors.

Referring to FIGS. 1 and 3, the topper assembly 20 includes an additional cutter head 44 that is positionable vertically up and down by a topper actuator 64. The cutter head 44 includes a cutting element 58 and a cutter head drive motor 60. The actuator 64, which is preferably a linear hydraulic actuator, acts between the platform 26 and the cutter head 44 to impart vertical motion thereto. The cutter head 44 is stabilized by stationary guide tubes 66 connected to the platform 26 and corresponding guide rods 68 slidable therein.

Figure 5:
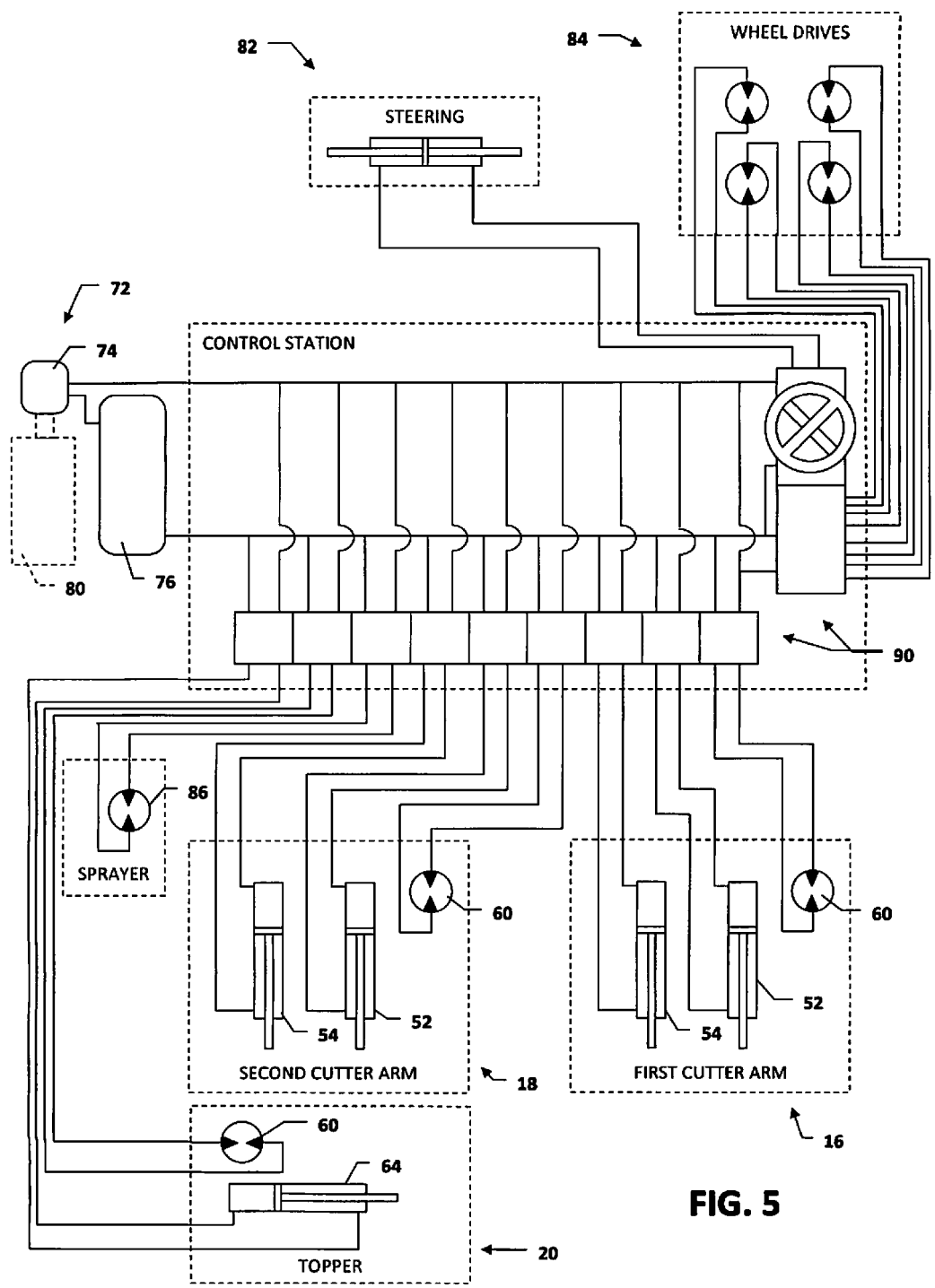
FIG. 5 is a hydraulic system schematic of the mobile hedging machine of FIG. 1.

Referring to FIG. 5, the various functions of the mobile hedging machine 10 are preferably powered by a hydraulic system 70. The hydraulic system 70 includes a hydraulic plant 72 with a hydraulic pump 74 and a hydraulic fluid reservoir 76 mounted on the platform 26 (see FIG. 3). The hydraulic pump 74 is preferably motor-driven; for instance, with diesel engine 80.

Loads of the hydraulic system 70 preferably include a steering motor 82, individual wheel drives 84 for each wheel 14, the actuators 52, 54, 64 and cutter drive motors 60 for the first and second cutter arms 16, 18 and the topper assembly 20, and a sprayer drive motor 86 (described in greater detail below). Corresponding hydraulic control manifolds are provided at the control station 22 to control the porting of pressurized hydraulic fluid to, and venting of hydraulic fluid from, the various system 10 loads. Advantageously, the wheel drives 84 can be selectively switched between 2- and 4-wheel drive operation. Other system components, such as fluid filters and strainers, vents, accumulators, reliefs and the like can be included, as appropriate. Linear actuators are preferably double-acting.

Referring to FIGS. 1 and 2, the mobile hedging machine 10 can be equipped with spray equipment to increase the functionality thereof. An agricultural spray, such as fertilizer, pesticide, fungicide, or other solution, is stored in one or more spray tanks 92. A blower 94, driven by drive motor 86, can be added to help disperse the agricultural spray. Under impulsion from a pressure source, such as pressurized air or a pump, the spray is forced into spray piping 96 and out a plurality of spaced spray nozzles 98 connected to the spray piping 96. The spray nozzles 98 can be distinct nozzles or simply openings in the piping 96. Preferably, the piping 96 is arranged under the platform 26 and down the rearward pair of legs 30 to form a generally U-shaped conduit. If desired to cover a large area, extensions can be added to the piping 96 extending outwards generally perpendicular to the travel direction.

In FIGS. 1-3, cutter heads 44 incorporating flail mower cutting elements 58 are employed; however, the present invention is not necessarily limited thereto. For example, referring to FIGS. 6-10, cutter heads 144, 244, 344 can be attached to the lower arm 42 in lieu of, or in combination with a cutter head 44. The cutter head 144 incorporates a rotary mower cutting element 158, the cutter head 244 incorporates a saw blade mower cutting element 258, and the cutter head 344 incorporates a sickle mower cutting element 358.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A mobile hedging machine comprising:
 a hedger frame including
  an upper platform extending between forward and rearward ends and first and second sides, and
  forward and rearward pairs of legs depending downwardly therefrom, the forward and rearward pairs of legs each forming a generally U-shaped passageway with the platform to accommodate plant growth thereunder during forward and rearward travel;
 a forward pair of wheels mounted to lower ends of the forward pair of legs;
 a rearward pair of wheels mounted to lower ends of the rearward pair of legs;
 a first cutter arm extending from the first side of the platform, the first cutter arm including
  a first upper arm slidably mounted to the platform,
  a first lower arm pivotably mounted to an outer end of the first upper arm,
  a first cutter head mounted to a lower end of the first lower arm,
  a first upper actuator for imparting side-to-side motion to the first upper arm, and
  a first lower actuator for imparting pivotal motion to the first lower arm; and
 a second cutter arm extending from the second side of the platform, the second cutter arm including
  a second upper arm slidably mounted to the platform,
  a second lower arm pivotably mounted to an outer end of the second upper arm,
  a second cutter head mounted to a lower end of the second lower arm,
  a second upper actuator for imparting side-to-side motion to the second upper arm, and
  a second lower actuator for imparting pivotal motion to the second lower arm;
 wherein the first and second cutter arms are operable to selectively engage plant growth passing under the platform with the first and second cutter heads.

2. The machine of claim 1, further comprising a control station arranged on the platform, the control station including controls for moving the machine on the wheels and operating the first and second cutter arms.

3. The machine of claim 1, further comprising:
 a hydraulic fluid reservoir; and
 a motor-driven hydraulic pump in fluid communication with the hydraulic fluid reservoir and the first and second upper and lower actuators.

4. The machine of claim 3, wherein the first and second cutter heads include cutter head hydraulic drive motors in fluid communication with the hydraulic pump.

5. The machine of claim 3, further comprising four hydraulic wheel drive motors, each of the wheel hydraulic drive motors connected to a respective one of the forward and rearward wheels and in fluid communication with the hydraulic pump.

6. The machine of claim 3, further comprising a hydraulic steering motor connected with the forward pair of wheels and in fluid communication with the hydraulic pump.

7. The machine of claim 1, wherein the first and second cutter heads each include at least one of:
 a rotary mower;
 a sickle mower;
 a saw blade mower; and
 a flail mower.

8. The machine of claim 1, wherein the second cutter arm extends from the second side of the platform rearwardly of the first cutter arm.

9. The machine of claim 1, wherein the first and second cutter arms are independently operable.

10. The machine of claim 1, further comprising:
an agricultural spray tank;
at least one spray nozzle arranged under the platform to dispense an agricultural spray from the agricultural spray tank; and
a spray pressure source to impel the agricultural spray from the spray tank out the at least one spray nozzle.

11. The machine of claim 10, further comprising spray duct piping extending under the platform and down one pair of the forward and rearward pairs of legs to form a generally elongated, U-shaped spray conduit, the at least one spray nozzle and a plurality of spaced additional spray nozzles being disposed along the spray duct piping.

12. The machine of claim 11, wherein the spray duct piping extends down each of the rearward pair of legs.

13. The machine of claim 10, further comprising a blower to disperse the agricultural spray impelled from the at least one spray nozzle.

14. The machine of claim 13, wherein the blower includes a hydraulic blower drive motor.

15. The machine of claim 1, further comprising a topper assembly connected to a forward end of the platform and having a topper cutter head and topper actuator operable to selectively vertically position the topper cutter head below the elevated platform to selectively engage plant growth.

16. A mobile hedging machine comprising:
a hedger frame including an elevated platform supported by at least four spaced apart elongated legs to form a passage under which hedges are traversable in a travel direction;
at least four motor-driven wheels respectively mounted to lower ends of the legs and defining forward and rearward wheels allowing the machine to be driven and steered, said machine being driven over hedges in a row during continuous movement of said machine along the row without engaging trunks of the hedges;
said machine further comprising
a first and second movable cutter arms extending from generally opposite sides and medially of the elevated platform generally perpendicular to the travel direction, and each of the cutter arms including an upper arm positionable and movable generally perpendicular to the travel direction, and a lower arm pivotable about an axis generally parallel to the travel direction, and a cutter head attached to a lower end of each of the lower arms, said cutter head of each said lower arm trimming respective sides of the hedges as said machine continuously moves along the row.

17. The machine of claim 16, wherein the first and second cutter arms are offset from each other in the travel direction.

18. The machine of claim 16, further comprising a topper assembly connected to a forward end of the platform, the topper assembly including a vertically positionable topper cutter head to trim the top of the hedges.

19. A mobile hedging machine comprising:
a hedger frame including
an upper platform extending between forward and rearward ends and first and second sides, and
forward and rearward pairs of legs depending downwardly therefrom, the forward and rearward pairs of legs each forming a generally U-shaped passageway with the platform to accommodate hedges thereunder during forward and rearward travel;
a forward pair of wheels mounted to lower ends of the forward pair of legs;
a forward pair of hydraulic wheel drive motors connected to the forward pair of wheels;
a rearward pair of wheels mounted to lower ends of the rearward pair of legs;
a rearward pair of hydraulic wheel drive motors connected to the rearward pair of wheels;
a hydraulic steering motor connected to at least one of the forward and rearward pair of wheels;
a first cutter arm extending from the first side of the platform, the first cutter arm including
a first upper arm slidably mounted to the platform,
a first lower arm pivotably mounted to an outer end of the first upper arm,
a first cutter head mounted to a lower end of the first lower arm, including a first cutter head hydraulic drive motor,
a first upper actuator for imparting side-to-side motion to the first upper arm, and
a first lower actuator for imparting pivotal motion to the first lower arm;
a second cutter arm extending from the second side of the platform rearward of the first cutter arm, the second cutter arm including
a second upper arm slidably mounted to the platform,
a second lower arm pivotably mounted to an outer end of the second upper arm,
a second cutter head mounted to a lower end of the second lower arm, including a second cutter head hydraulic drive motor,
a second upper actuator for imparting side-to-side motion to the second upper arm, and
a second lower actuator for imparting pivotal motion to the second lower arm;
a hydraulic fluid reservoir;
a motor-driven hydraulic pump in fluid communication with the hydraulic fluid reservoir and in fluid communication with
the forward and rearward hydraulic drive motors,
the hydraulic steering motor,
the first and second upper and lower actuators, and
the first and second cutter head hydraulic drive motors; and
a control station arranged on the platform, the control station including controls respectively for the forward and rearward hydraulic drive motors, the hydraulic steering motor, the first and second upper and tower actuators and the first and second cutter head hydraulic drive motors, allowing an operator to drive the machine over plant growth while selectively engaging the plant growth with the first and second cutter heads.

20. The machine of claim 19, further comprising:
an agricultural spray tank;
spray duct piping extending under the platform and down the rearward pair of legs to form a generally U-shaped spray conduit;
a plurality of spaced spray nozzles disposed on the spray duct piping to dispense an agricultural spray from the agricultural spray tank;
a blower to disperse the agricultural spray impelled out of the spray nozzles; and
a hydraulic blower drive motor in fluid communication with the hydraulic pump.

* * * * *